(12) United States Patent
Fujieda et al.

(10) Patent No.: US 11,231,692 B2
(45) Date of Patent: Jan. 25, 2022

(54) PROCESS LINE HMI SYSTEM

(71) Applicant: Toshiba Mitsubishi-Electric Industrial Systems Corporation, Tokyo (JP)

(72) Inventors: Hiroyuki Fujieda, Tokyo (JP); Nobuo Shimizu, Tokyo (JP); Akira Nojima, Tokyo (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 0 days.

(21) Appl. No.: 17/053,369

(22) PCT Filed: Oct. 31, 2018

(86) PCT No.: PCT/JP2018/040487
§ 371 (c)(1),
(2) Date: Nov. 6, 2020

(87) PCT Pub. No.: WO2020/090027
PCT Pub. Date: May 7, 2020

(65) Prior Publication Data
US 2021/0191356 A1      Jun. 24, 2021

(51) Int. Cl.
*G05B 19/05*      (2006.01)
(52) U.S. Cl.
CPC ......... *G05B 19/054* (2013.01); *G05B 19/058* (2013.01); *G05B 2219/1105* (2013.01);
(Continued)
(58) Field of Classification Search
CPC ................ G05B 19/054; G05B 19/058; G05B 2219/1105; G05B 2219/1116;
(Continued)

(56) References Cited

U.S. PATENT DOCUMENTS

| | | | | |
|---|---|---|---|---|
| 4,674,310 | A | * | 6/1987 | Ginzburg ................ B21B 38/02 72/11.4 |
| 2016/0328870 | A1 | | 11/2016 | Park |
| 2017/0068498 | A1 | | 3/2017 | Hashem |

FOREIGN PATENT DOCUMENTS

| | | | | |
|---|---|---|---|---|
| EP | 2315094 B1 | | 6/2016 | |
| JP | 09327714 A | * | 12/1997 | ............. B21B 37/50 |

(Continued)

OTHER PUBLICATIONS

International Search Report and Written Opinion dated Jan. 8, 2019 for PCT/JP2018/040487 filed on Oct. 31, 2018, 6 pages including English Translation of the International Search Report.

(Continued)

*Primary Examiner* — Kenneth M Lo
*Assistant Examiner* — Mohammed Shafayet
(74) *Attorney, Agent, or Firm* — Xsensus LLP

(57) ABSTRACT

An HMI renders on an HMI screen a process line which includes: a movable looper group part obtained by grouping at least one movable roll part and a plurality of line parts connected to the movable roll part; and a plurality of fixed roll parts connected to the movable looper group part. The HMI continuously obtains a process line length from an output signal of a monitoring target device. The HMI calculates a looper movement amount by dividing a difference between a process line total length and the process line length by the number of parts in the plurality of line parts which are shared by the movable looper group part with the plurality of fixed roll parts. The HMI changes a relative position between the plurality of fixed roll parts and the movable looper group part on the HMI screen according to the looper movement amount.

7 Claims, 10 Drawing Sheets

(52) U.S. Cl.
CPC ............... *G05B 2219/1116* (2013.01); *G05B 2219/14006* (2013.01)

(58) Field of Classification Search
CPC ........ G05B 2219/14006; G05B 19/042; G05B 23/0216; G05B 19/05
See application file for complete search history.

(56) References Cited

FOREIGN PATENT DOCUMENTS

| JP | 3753056 B2 | * | 3/2006 | ............. B21C 49/00 |
|----|------------|---|--------|--------------------------|
| JP | 2012121032 A | * | 6/2012 | ............. B21B 39/14 |
| JP | 2014231432 A | * | 12/2014 | ........... B65H 23/038 |
| JP | 2015033702 A | * | 2/2015 | ............. B21B 39/14 |
| JP | 2017-27211 A | | 2/2017 | |

OTHER PUBLICATIONS

Office Action dated Jul. 22, 2021, in corresponding Indian patent Application No. 202017047559, 6 pages.

* cited by examiner

PROCESS LINE HMI SYSTEM

CROSS-REFERENCE TO RELATED APPLICATION

The present application is based on PCT filing PCT/JP2018/040487, filed Oct. 31, 2018, the entire contents of which are incorporated herein by reference.

FIELD

The present invention relates to a process line HMI system.

BACKGROUND

Supervisory Control And Data Acquisition (SCADA) is known as a mechanism that performs supervisory control of social infrastructure systems. The social infrastructure systems include steel rolling systems, power transmission and transformation systems, water and sewage treatment systems, building management systems, road systems, and the like.

SCADA is a type of industrial control system that performs system monitoring and process control by computer. In the SCADA, a quick responsiveness (real-time property) in accordance with system processing performance is necessary.

SCADA is usually composed of the following subsystems.

(1) HMI (Human Machine Interface)

An HMI is a mechanism that presents data of a target process (monitoring target device) to an operator and allows the operator to monitor and control the process. For example, in PTL 1, a SCADA HMI including an HMI screen that runs on a SCADA client is disclosed.

(2) Supervisory Control System

A supervisory control system collects signal data on a process and transmits a control command to the process. It is constituted of a programmable logic controller (PLC), and the like.

(3) Remote Input/Output Device (Remote Input Output: RIO)

A remote input/output device, which is connected with a sensor installed within the process, converts a signal of the sensor into digital data and transmits the digital data to the supervisory control system.

(4) Communication Base

A communication base connects the supervisory control system and the remote input/output device.

CITATION LIST

Patent Literature

[PTL 1] JP 2017-27211 A

SUMMARY

Technical Problem

One of the above-mentioned steel rolling systems is a process line. The process line is a line where heat treatment (annealing line), surface treatment (plating line, color coating line), and the like are performed for a cold-rolled sheet (strip). The process line includes a looper in addition to a facility that processes the strip. The looper includes a movable roll and a fixed roll; and the strip is wound around the movable roll and the fixed roll. The looper increases a distance between the movable roll and the fixed roll to store the strip and decreases the distance to deliver the strip. This allows the looper to adjust a moving speed of the strip on the process line.

In the SCADA HMI, it is necessary to be able to dynamically change the shape of the process line displayed on the HMI screen so as to represent such a looper operation. However, in conventional SCADA HMIs, screen parts specialized in representation of the looper operation are not provided and it is not easy to render the looper operation as described above on the HMI screen.

The present invention has been made in order to solve the above-mentioned problem and it is an object of the present invention to provide a process line HMI system capable of easily representing a looper operation on an HMI screen.

Solution to Problem

In order to achieve the above object, a process line HMI system according to the present invention is configured as follows.

First processing of the process line HMI system renders on an HMI screen a process line which includes: a movable looper group part obtained by grouping at least one movable roll part and a plurality of line parts connected to the movable roll part; and a plurality fixed roll parts connected to the movable looper group part. Second processing continuously obtains a process line length from the monitoring target device. Third processing calculates a looper movement amount by dividing a difference between a process line total length and the process line length at each time by the number of parts in the plurality of line parts which are shared by the movable looper group part with the plurality of fixed roll parts. The process line length is a line length from a looper inlet side to a looper outlet side. The process line total length is a process line length in a case where a distance between the movable looper group part and the fixed roll parts is maximized. Fourth processing changes, on the HMI screen, a relative position between the plurality of fixed roll parts and the movable looper group part according to the looper movement amount.

In one aspect, the process line HMI system continuously obtains from the monitoring target device a line length from a start point of the process line to a Weld point; and changes a position of the Weld point on the process line according to the line length.

In another aspect, the process line further includes a reel part whose circumference is contacted by one end of the line parts. The process line HMI system continuously obtains a reel diameter from the monitoring target device and changes the diameter of the reel part while the one end of the line parts is in contact with the circumference, according to the reel diameter.

In yet another aspect, the movable roll part or the fixed roll parts include a plurality of glue points on its circumference. The process line HMI system automatically generates a third line part that is connected to a first line part and a second line part along an arc between a first glue point to which one end of the first line part is connected and a second glue point to which one end of the second line part is connected.

Advantageous Effects of Invention

According to the process line HMI system of the present invention, the operation of the looper movable part can be easily represented on the HMI screen by using a group part.

DESCRIPTION OF EMBODIMENTS

Figure 1:
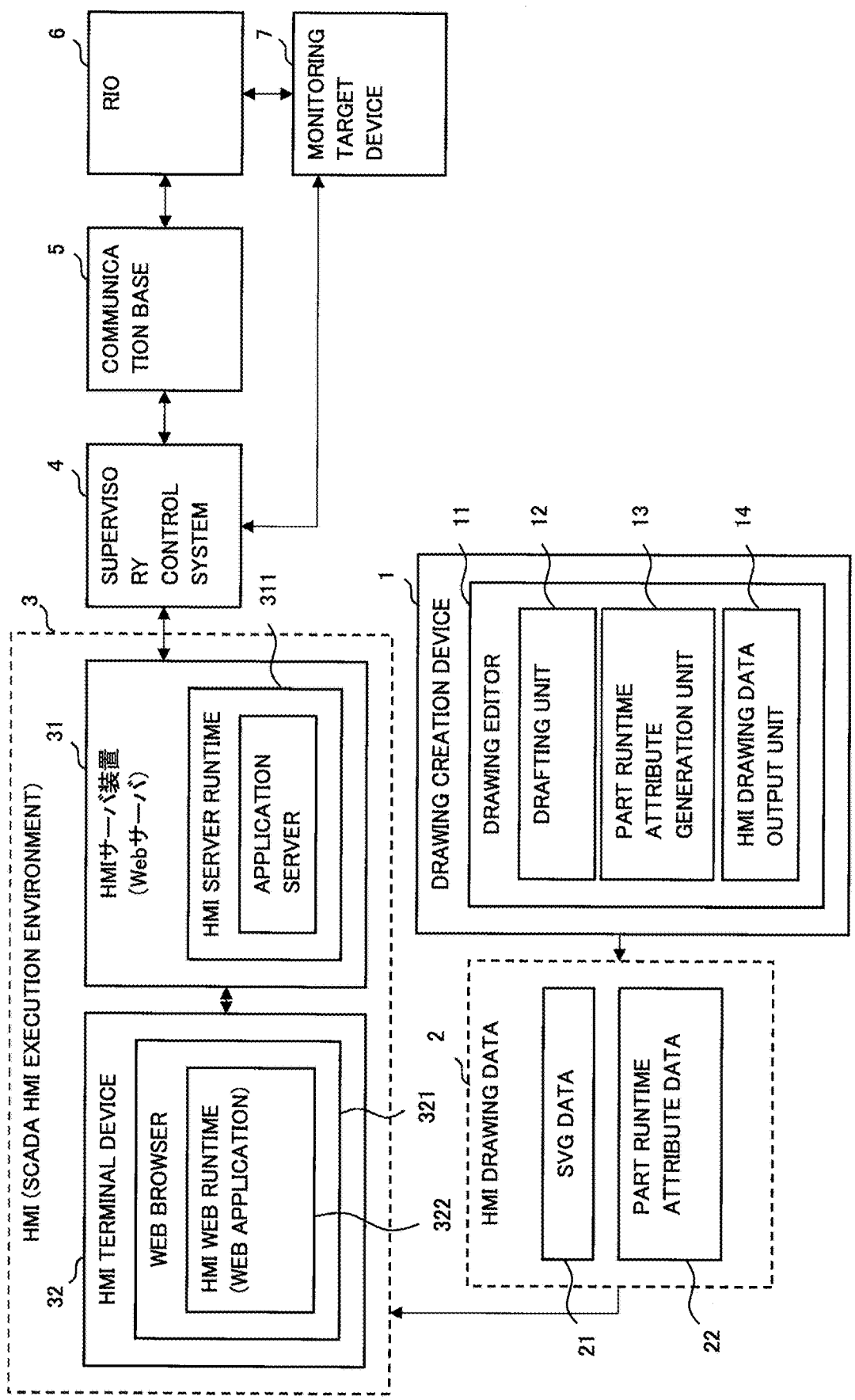
FIG. 1 is a diagram showing a system configuration of SCADA.

Hereinafter, an embodiment of the present invention will be described in detail with reference to drawings. However, when numbers such as the number, quantity, volume, or range of elements are referred to in the embodiment presented below, the present invention is not limited by the numbers referred to except where especially explicitly specified and where explicitly specified to the numbers in principle. In addition, structures and the like that are described in the embodiment presented below are not necessarily required for this invention except where especially explicitly specified and where obviously specified thereto in principle. Note that common elements in the drawings are denoted by the same reference signs to omit redundant explanations.

First Embodiment

<Whole System>

FIG. 1 is a diagram showing a system configuration of SCADA. The SCADA includes an HMI 3, a supervisory control system 4, a communication base 5, and an RIO 6 as subsystems; and connects to a monitoring target device 7. Herein, the HMI 3 that is a SCADA HMI execution environment and a drawing creation device 1 that is a SCADA HMI development environment are inclusively referred to as a process line HMI system.

The supervisory control system 4, the communication base 5, and the RIO 6 are as described in Background and therefore, their descriptions will be omitted. The monitoring target device 7 includes a sensor, an actuator, and the like that constitute a plant to be monitored and controlled.

The drawing creation device 1 includes a drawing editor 11. The drawing creation device 1 that is a development environment generates HMI drawing data 2 by the drawing editor 11. The HMI drawing data 2 includes scalable vector graphics (SVG) data 21 and part runtime attribute data 22.

The HMI 3 (HMI subsystem) includes an HMI server device 31 and an HMI terminal device 32. The HMI 3 that is an execution environment operates as an HMI subsystem in coordination between an HMI Web Runtime 322 (web application) which reads the HMI drawing data 2 and runs on a web browser 321 and an HMI Server Runtime 311.

<Drawing Creation Device>

The drawing editor 11 included in the drawing creation device 1 has an advanced drawing editing function and a function that allows drawing data to be saved in SVG format. The drawing editor 11 is, as one example, Microsoft Visio (registered trademark).

The drawing editor 11 which runs on the drawing creation device 1 includes a drafting unit 12, a part runtime attribute generation unit 13, and an HMI drawing data output unit 14.

Figure 2:
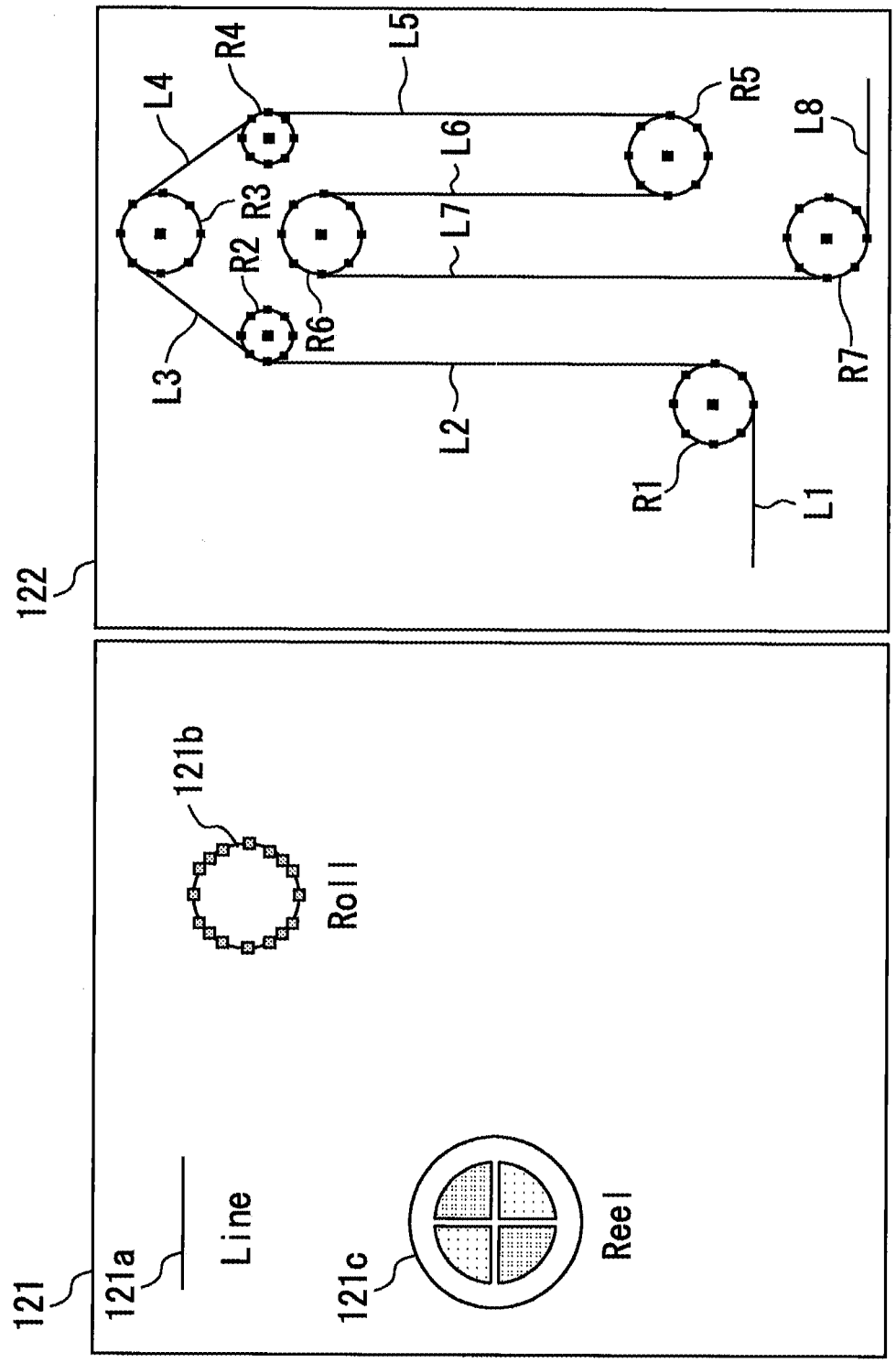
FIG. 2 is one example of a drawing creation screen displayed by a drawing editor.

With reference to FIG. 2, a drawing creation screen displayed by using the drafting unit 12 will be described. FIG. 2 is an example of the drawing creation screen displayed by the drawing editor 11.

Figure 11:
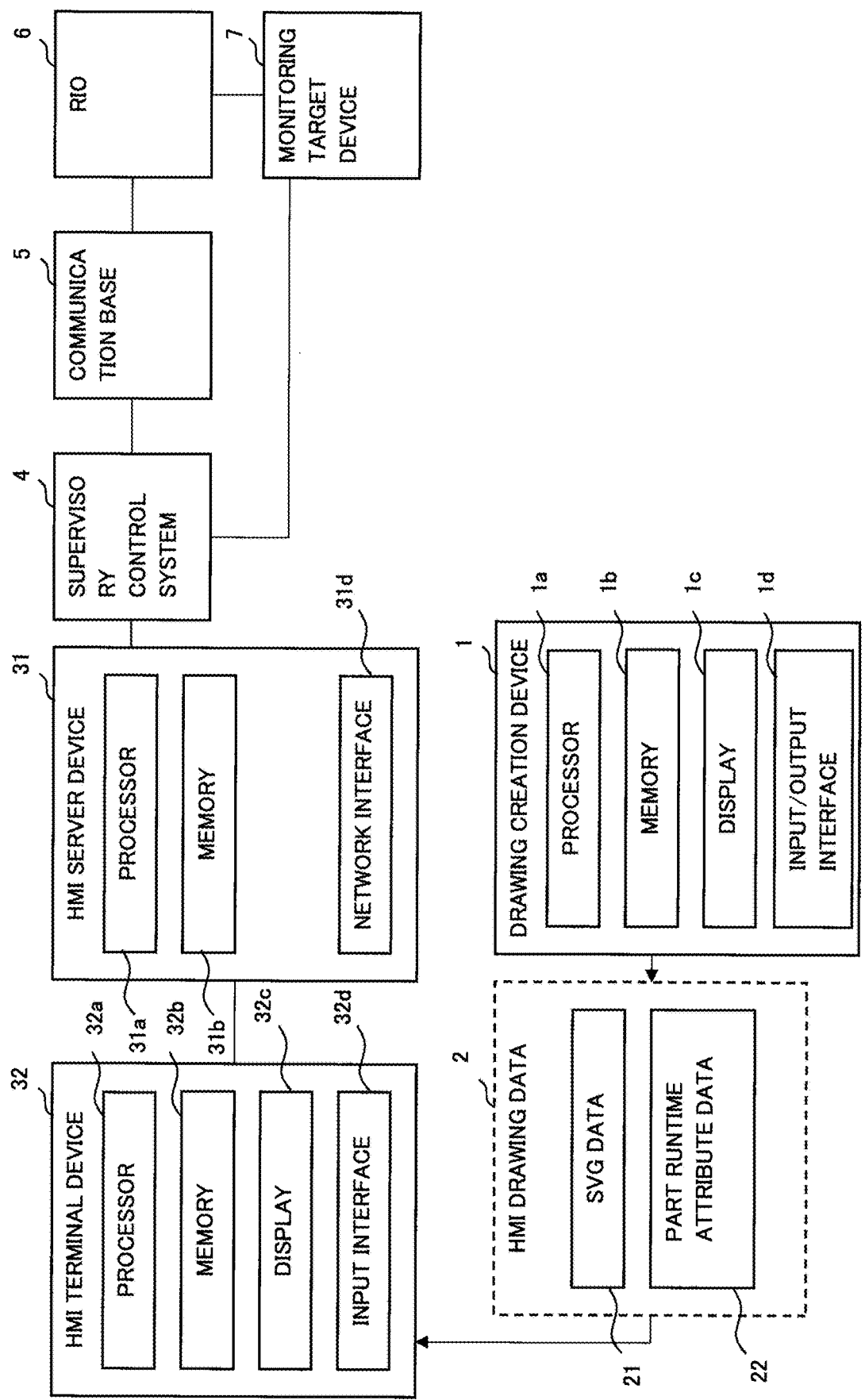
FIG. 11 is a block diagram showing an example of a hardware configuration of a process line HMI system.

The drafting unit 12 displays side-by-side on a display 1c (FIG. 11), a stencil area 121 where prototypes of parts necessary to create a drawing are arranged and a drafting area 122 where the drawing is rendered. In addition, the drafting unit 12 allows parts on the stencil area 121 which are selected by a developer to be arranged on the drawing in the drafting area 122 by using an input/output interface 1d (FIG. 11).

In the stencil area 121 shown in FIG. 2, a prototype 121a of a line part, a prototype 121b of a roll part, and a prototype 121c of a reel part are displayed. The HMI screen developer can copy (drag and drop) a part on the stencil area 121 and arrange it at any position on the drawing in the drafting area 122. In the drafting area 122 in FIG. 2, a process line indulging a looper is rendered. A movable part of the looper is rendered in a state (at a highest position) that allows a maximum storage of the strip. L1 to L8 are line parts; and R1 to R7 are roll parts.

Thus, in the drafting area 122, a drawing where parts are arranged is created. The parts have static display attributes such as color, shape, position, and size. The static display attributes can be changed on the drafting area 122.

Figure 3:
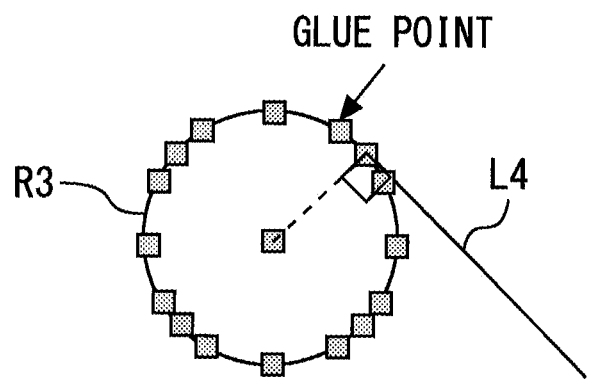
FIG. 3 is a diagram for describing joining between a roll part and a line part in a drafting area.

FIG. 3 is a diagram for describing joining between a roll part and a line part in the drafting area 122. In FIG. 3, as an example, a state of joining between the roll part R3 and the line part L4 of FIG. 2 is rendered. The roll part has a plurality of, n pieces of, glue points on its circumference. An end point of the line part can be joined to the glue points.

The line part is joined so as to be a tangent line of the roll part. The roll part shown in FIG. 3 has 16 glue points. The glue points are arranged every 30 degrees or 45 degrees. Therefore, when the line part is wound around the roll part at an angle that is an integer multiple of 45 degrees or 30 degrees, it is possible to create a drawing with this stencil. If it is wound at an angle that is not compatible with this stencil, it becomes possible by increasing the number of glue points.

Figure 4:
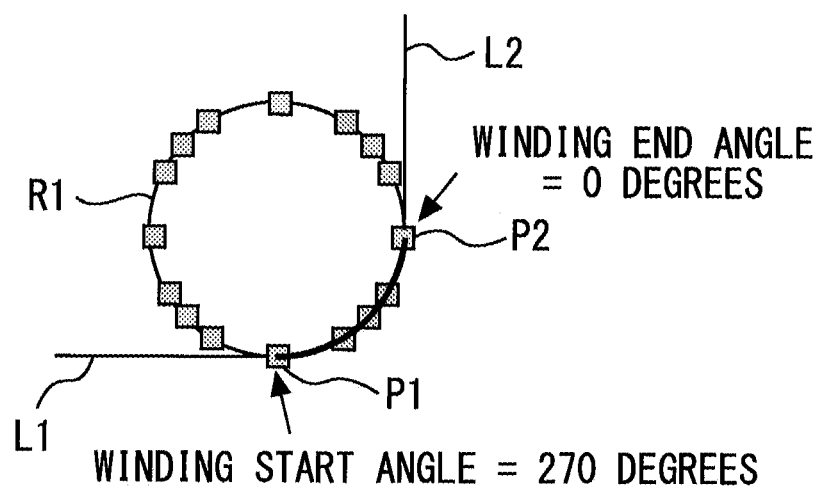
FIG. 4 is a diagram for describing a state where a strip is wound around a roll.

FIG. 4 is a diagram for describing a state where a strip is wound around a roll. In FIG. 4, as an example, a state in which the strip is wound around the roll R1 of FIG. 2 is rendered.

The drafting unit 12 automatically generates a third line part that is connected to a first line part L1 and a second line part L2 along an arc between a first glue point P1 to which one end of the first line part L1 is connected and a second glue point P2 to which one end of the second line part L2 is connected.

In addition, the part runtime attribute generation unit 13 automatically calculates a winding angle of the strip based on a positional relation between the line part and the roll part. In an example of FIG. 4, a line part is wound around the roll part R1 by 90 degrees from 270 degrees to 0 degrees. The part runtime attribute generation unit 13 calculates a start angle and end angle of winding of the line part around the roll part; and includes them into a part runtime attribute of the roll part.

Figure 5:
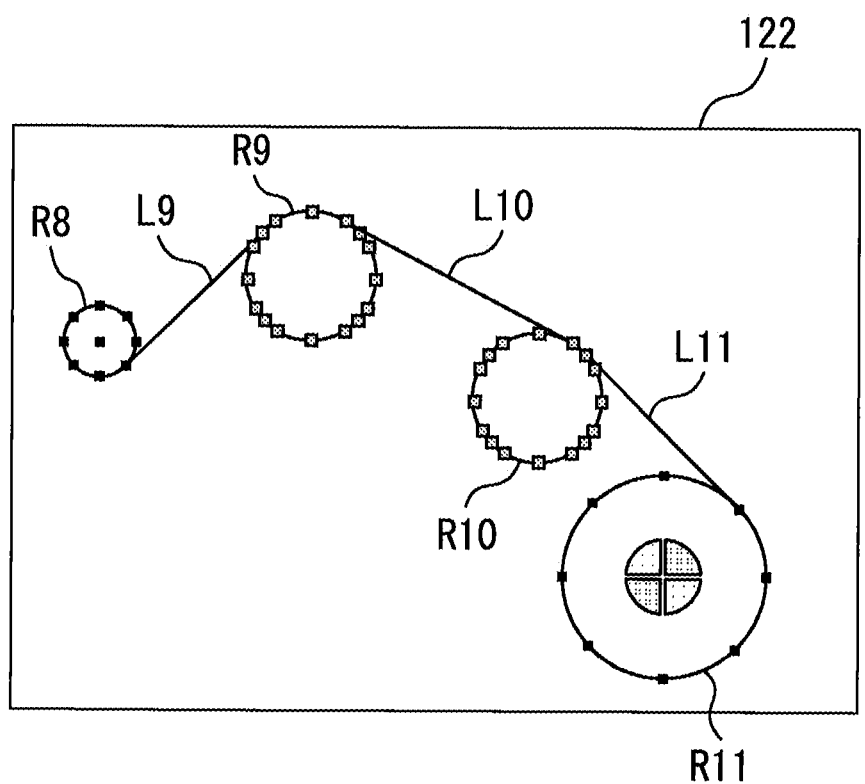
FIG. 5 is a diagram showing a process line including a reel part.

FIG. 5 is a diagram showing a process line including a reel part. Process lines including a reel part include a process line including a coil holder and a process line including a tension reel. In a drafting area 122 of FIG. 5, a process line indulging a tension reel is rendered. L9 to L11 are line parts; R8 to R10 are roll parts; and R11 is a reel part.

The reel part is also a type of roll part, whose circumference is contacted by one end of the line parts. The reel part changes its outer circle diameter according to a thickness of a wounded strip. The part runtime attribute generation unit 13 includes, in a part runtime attribute of the reel part, an angle of winding the line part around the reel part and a signal name indicating a current diameter (%) with respect to a maximum diameter to which the strip is wound. The part is associated with signal data and a control command via the signal name.

Figure 6:
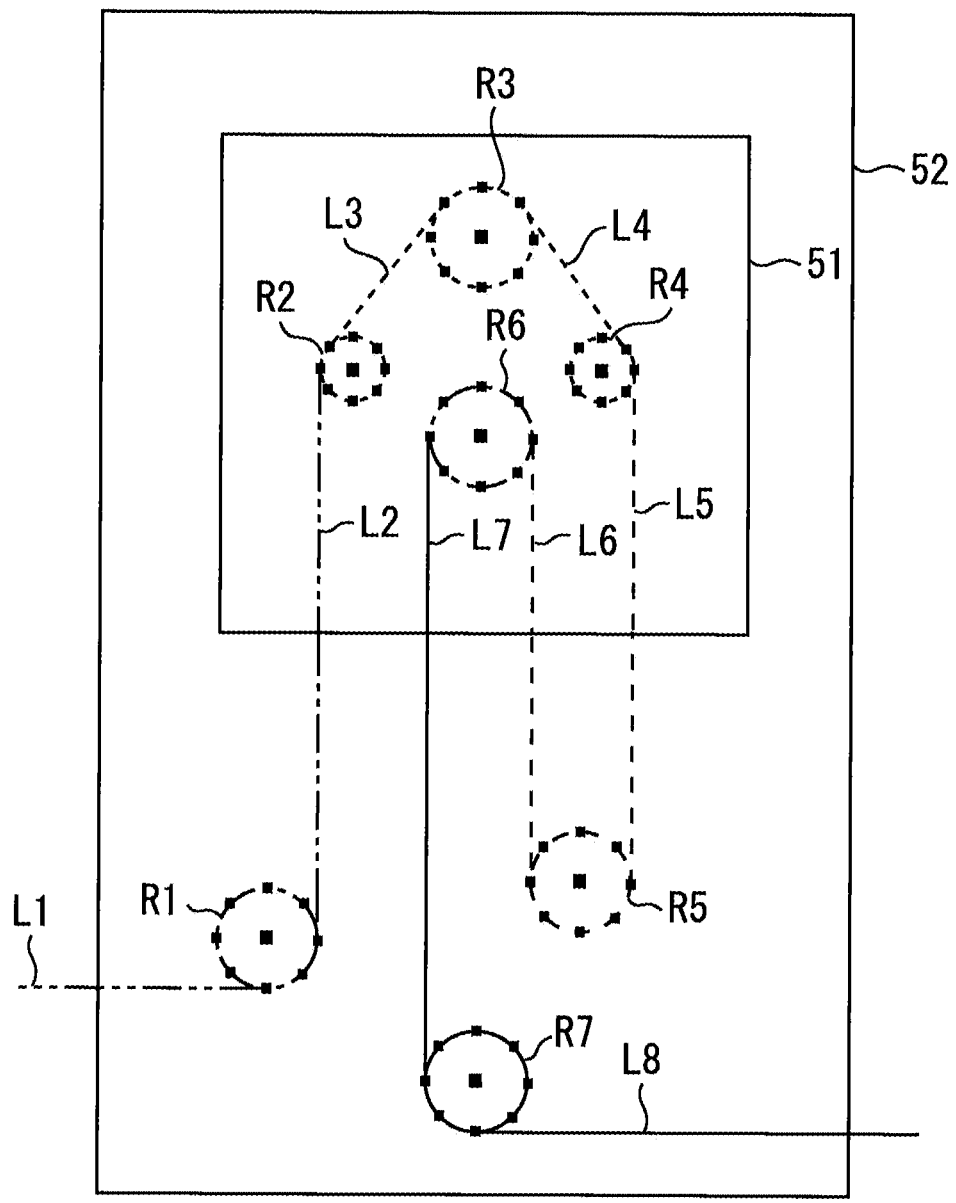
FIG. 6 is a diagram for describing a group part obtained by integrating a plurality of parts.

FIG. 6 is a diagram for describing a group part obtained by integrating a plurality of parts. The drafting unit 12 can create a group part by grouping a plurality of parts on the drafting area 122. In addition, the part runtime attribute generation unit 13 can generate a part runtime attribute for the group part.

In a looper shown in FIG. 6, roll parts R1, R5, and R7 are fixed roll parts and roll parts R2 to R4, and R6 are movable roll parts that move up and down. Whether fixed or movable is set as a static display attribute of each roll part.

A movable looper group part 51 represents a looper movable part. The movable looper group part 51 is a group part obtained by grouping at least one movable roll part (R2 to R4, R6) and a plurality of line parts (L2 to L7) connected to the movable roll part. A part runtime attribute of the movable looper group part 51 includes a moving path indicating a movable range of the looper and a signal name indicating a position of the looper.

A process line group part 52 is a group part including a plurality of fixed roll parts (R1, R5, R7) connected to the movable looper group part 51. A part runtime attribute of the process line group part 52 includes: a process line total length (maximum length), a signal name indicating a process line current length (only when including a looper movable part); a signal name indicating a position (i=0 to n) of a Weld point; and a signal name of a display mark indicating the Weld point.

Similarly, the process line including a reel part shown in FIG. 5 can also be grouped as a process line group part.

Figure 7:
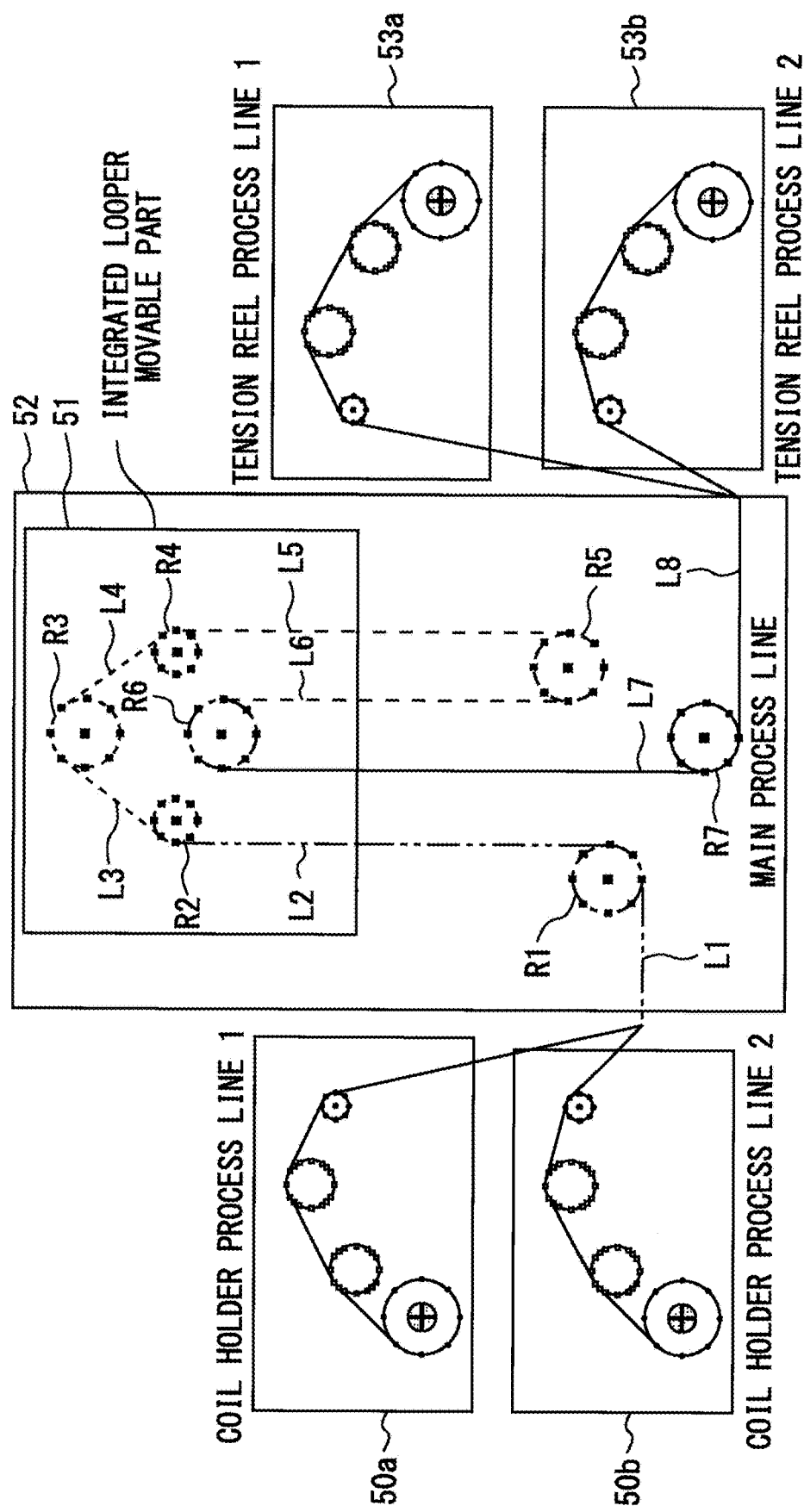
FIG. 7 is a diagram showing one example of a drawing in which process line group parts are combined.

FIG. 7 is a diagram showing one example of a drawing in which process line group parts are combined. Process lines including a coil holder and a tension reel branch and therefore, are grouped as separate process line group parts so as to allow independent calculation of a line length. In FIG. 7, process line group parts 50a, 50b representing coil holder process lines and process line group parts 53a, 53b representing tension reel process lines are connected to the process line group part 52 representing a main process line including a looper. These process line group parts are combined, so that a drawing displayed as an HMI screen is configured.

Process lines are grouped based on the following rules:
(1) Those being able to be grouped as a process group part are line parts, roll parts, and reel parts which are continuously joined to each other.
(2) A process line group part can include at most one looper movable part (movable looper group part) or reel part.
(3) A process line group part has its total length (in meters) as a constant (facility data).
(4) When a process line group part includes a looper movable part (movable looper group part), a current process line length (a value smaller than a total length) is provided as an item value (signal data) so as to change a looper height.

Returning to FIG. 1, description will be continued. The HMI drawing data output unit 14 outputs HMI drawing data 2 that includes SVG data 21 of a drawing where parts rendered in the drafting area 122 are arranged and the part runtime attribute data 22. The SVG data 21 includes, as SVG element attributes, static display attributes (color, shape, position, size, and the like) of the arranged parts.

<HMI Terminal Device>

The HMI terminal device 32 includes the web browser 321 and the HMI Web Runtime 322 in advance.

The web browser 321 reads at least one piece of the SVG data 21 and displays an HMI screen. The HMI screen is configured by combining a plurality of drawings defined by the SVG data 21.

A drawing in SVG format (SVG data 21) is read by the HMI Web Runtime 322 into a Document Object Model (DOM) (not illustrated) which is managed by the web browser 321; and is rendered. When the HMI Web Runtime 322 has made a change to an SVG element within the DOM so as to operate a part on the HMI screen, the web browser 321 detects the change and updates the HMI screen.

The HMI Web Runtime 322 reads the HMI drawing data 2 as a setting parameter and runs on the web browser 321. The HMI Web Runtime 322 is a library (set of scripts) in which a specific processing content is predetermined for each part type. A setting parameter (for example, a specific signal name) is applied to a script so as to specify one part on the HMI screen and processing specific to the part is performed. That is, even for parts of the same type, a setting parameter (for example, a specific signal name) which is set to each of the parts is different and therefore, the operation of each of the parts differs.

Figure 8:
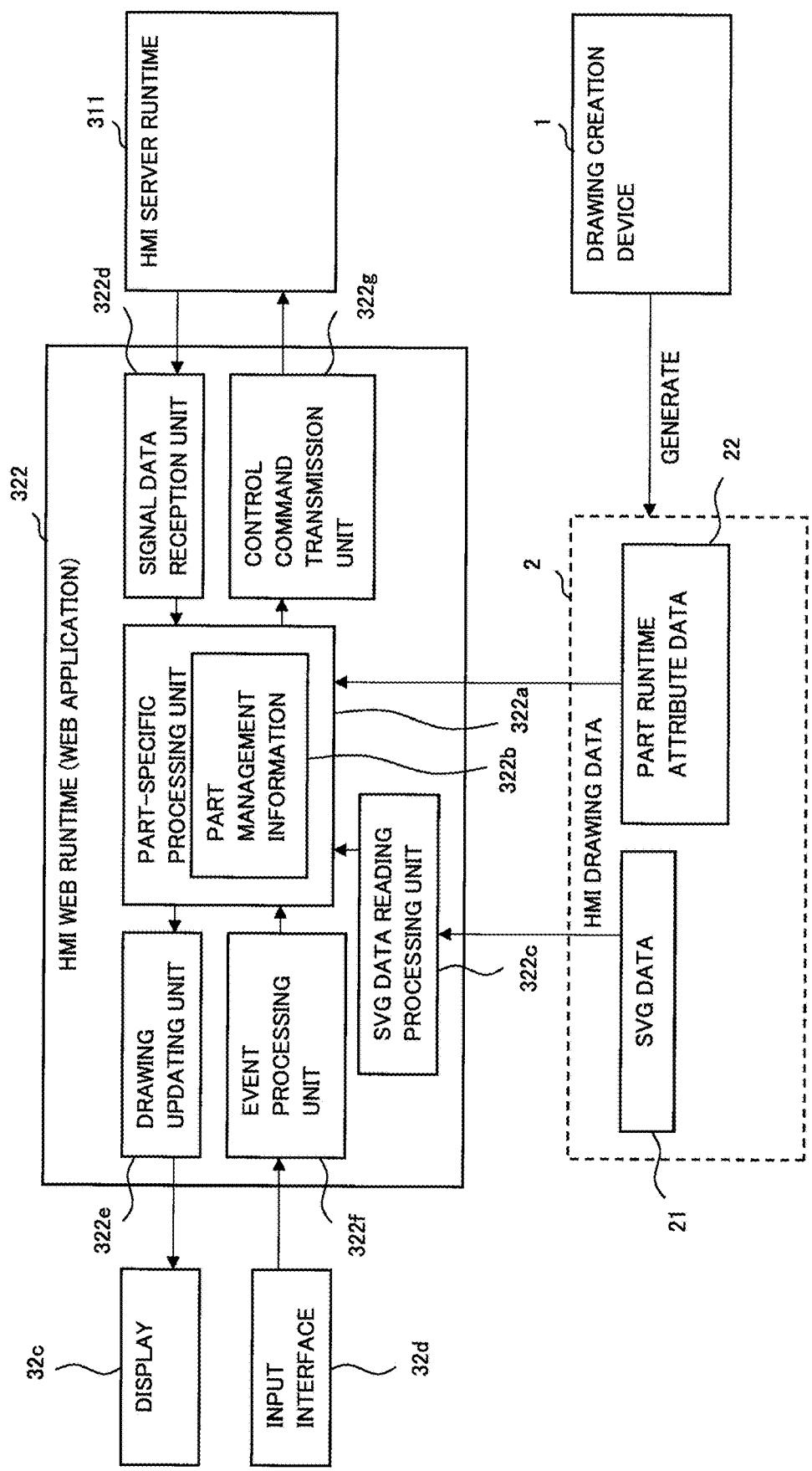
FIG. 8 is a diagram for describing a configuration of an HMI Web Runtime that runs on a web browser of an HMI terminal device.

FIG. 8 is a diagram for describing a configuration of the HMI Web Runtime 322 that runs on the web browser 321 of the HMI terminal device 32. The HMI Web Runtime 322 associates a part and signal data from the monitoring target device 7 by a setting parameter; and when receiving signal data corresponding to a specific signal name from the monitoring target device 7, changes display of a part corresponding to the specific signal name, on the HMI screen.

More specifically, the HMI Web Runtime 322 includes a part-specific processing unit 322a, an SVG data reading processing unit 322c, a signal data reception unit 322d, a drawing updating unit 322e, an event processing unit 322f, and a control command transmission unit 322g.

The SVG data reading processing unit 322c reads the SVG data 21. The part-specific processing unit 322a includes the static display attributes of the SVG data 21 in part management information 322b. The part-specific processing unit 322a reads part runtime attribute data 22 corresponding to each of the parts included in the SVG data 21; and includes it in the part management information

322b. In the part management information 322b, a specific signal name for associating each part on the HMI screen and signal data from the monitoring target device, and information required to dynamically display a part according to signal data corresponding to the signal name are provided.

The part-specific processing unit 322a applies the part management information 322b as a setting parameter to a library (JavaScript (registered trademark) program) in which a processing content specific to each part type, described later, is predetermined, so as to make individual parts on the HMI screen function.

The signal data reception unit 322d receives signal data from the monitoring target device 7 via the HMI Server Runtime 311. The part-specific processing unit 322a specifies a part corresponding to the received signal data based on the part management information 322b; and determines an update instruction for part display on the drawing. This update instruction to the specified part is transmitted to the drawing updating unit 322e. The specified part on the web browser 321, which is displayed on a display 32c, changes its display based on the update instruction.

Concrete processing of the part-specific processing unit 322a will be described. In specific processing of a process line group part, a process line current length is obtained from signal data of the monitoring target device 7; a difference between a process line total length and the process line current length is divided by the number of parts in a plurality of line parts (L2, L5 to L7) which are shared by a movable looper group part with a plurality of fixed roll parts (R1, R5, R7), to calculate a looper movement amount. Here, a process line length is a line length from a looper inlet side (R1) to a looper outlet side (R7). The process line total length is a process line length in a case where a distance between the movable looper group part 51 and the fixed roll parts (R1, R5, R7) is maximized. A looper movement amount h (movement amount from the maximum height of the movable looper group part) is represented by the following expression (1).

$$h = (\text{process line total length} - \text{process line current length})/n \quad (1)$$

where n is the number of line parts which are shared by the movable looper group part with other fixed roll parts.

Note that the signal data do not need to be a process line current length itself. When the signal data is each line part length, a process line current length can be calculated from the following expression (2), where the process line current length is L, a length of a line part (i) is line (i), a diameter of a roll part is R, a winding end angle of a roll part (j) is $Roll_E(j)$, a winding start angle of the roll part (j) is $Roll_S(j)$.

$$L = \Sigma_i(\text{line}(i))$$
$$+ \Sigma_j(R \times \pi \times (Roll_E(j) - Roll_S(j))/360) \quad (2)$$

Figure 9:
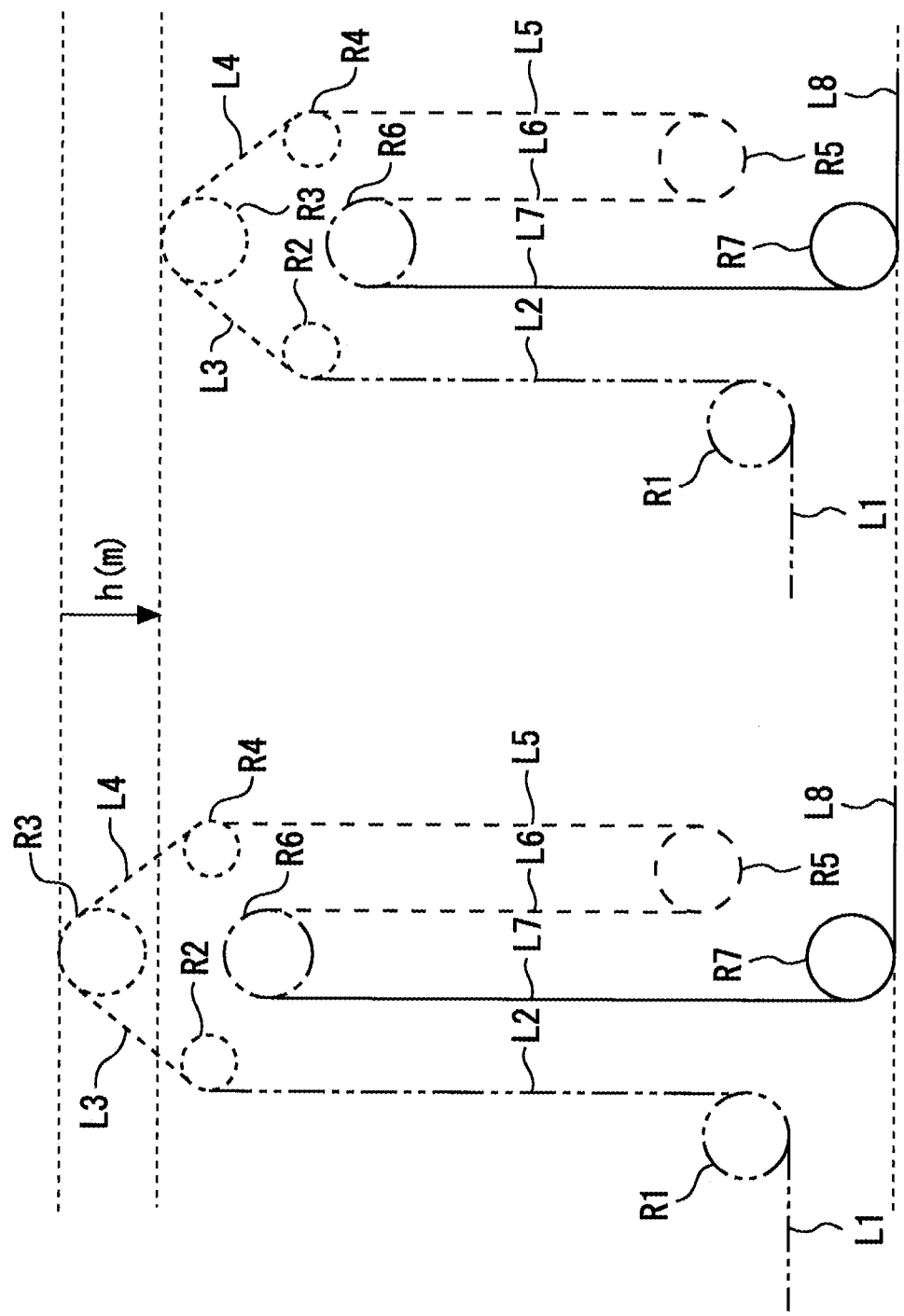
FIG. 9 is a diagram showing a looper movement amount of a movable looper group part.

The part-specific processing unit 322a transmits an update instruction for the movable looper group part on the HMI screen to the drawing updating unit 322e according to the looper movement amount h. This updates the SVG element and changes a relative position between the fixed roll parts and the movable looper group part on the HMI screen. As shown in FIG. 9, the movable looper group part is rendered at a position lowered by the looper movement amount h (m) from its maximum height.

Figure 10:
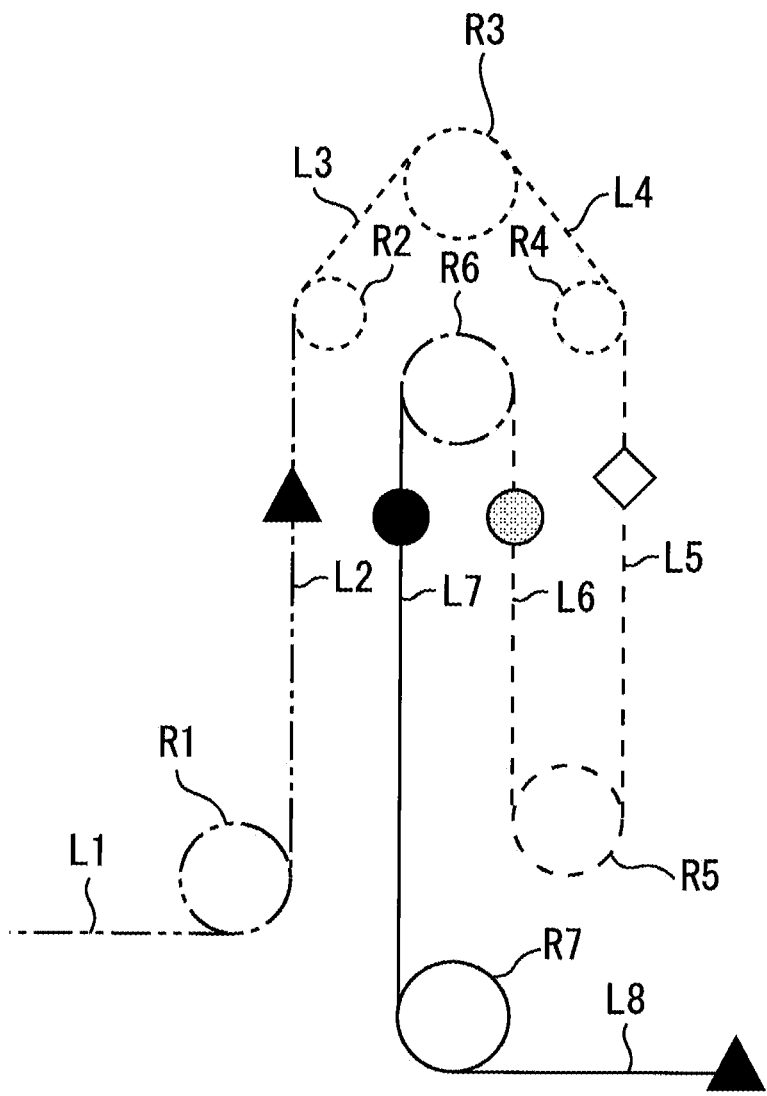
FIG. 10 is a diagram showing an example of putting a different display mark for each Weld point.

In addition, in the specific processing of a process line group part, a line length from a start point (looper inlet side (R1)) of the process line to a Weld point is obtained from the monitoring target device 7 and a position and display mark of the Weld point which is to be rendered on the process line are determined according to the line length. The part-specific processing unit 322a transmits an update instruction for the process line group part on the HMI screen to the drawing updating unit 322e according to the determined Weld point position and display mark. FIG. 10 is a diagram showing an example of putting a different display mark for each Weld point. A type of the display mark can be changed according to a signal value from the monitoring target device 7.

In addition, in specific processing of a reel part, a current reel diameter is obtained from the monitoring target device, and a diameter of the reel part and the length of the line parts are changed according to the current reel diameter while one end of the line parts is in contact with a circumference. The part-specific processing unit 322a transmits an update instruction for the reel part on the HMI screen to the drawing updating unit 322e according to the determined reel part diameter and line part length.

In addition, the event processing unit 322f detects a keyboard or mouse event associated with each part. The part-specific processing unit 322a determines a control command corresponding to the detected event, based on the part management information 322b. The control command transmission unit 322g transmits the control command to the HMI Server Runtime 311.

<HMI Server Device>

The HMI Server Runtime 311 runs on the HMI server device 31. Processing of the HMI Server Runtime 311 is as follows.

(1) Incorporates an application server and provides an HMI Web Runtime content to the web browser 321.
(2) Communicates with the supervisory control system 4, transmits signal data from the monitoring target device 7 to the HMI Web Runtime 322, and transmits a control command from the HMI Web Runtime 322 to the supervisory control system 4.

As described above, according to the process line HMI system of the present embodiment, the operation of the looper movable part can be easily represented on the HMI screen by defining a group part.

<Hardware Configuration Example>

A hardware configuration of a main part of the process line HMI system will be described with reference to FIG. 11. FIG. 11 is a block diagram showing an example of the hardware configuration of the process line HMI system.

Each unit of the drawing creation device 1 shown in FIG. 1 indicates a part of functions included in the drawing creation device 1 and each of the functions is implemented by a processing circuit. The processing circuit is constituted by connecting a processor 1a, a memory 1b, a display 1c, and an input/output interface 1d. The input/output interface 1d is an input device such as a keyboard or a mouse, and a device capable of outputting the HMI drawing data 2 to a file. The processor 1a executes various programs stored in the memory 1b and thereby implements the functions of the units of the drawing creation device 1.

Each unit of the HMI terminal device 32 shown in FIG. 1 indicates a part of functions included in the HMI terminal device 32 and each of the functions is implemented by a processing circuit. The processing circuit is constituted by connecting a processor 32a, a memory 32b, a display 32c, and an input interface 32d. The input interface 32d is an input device such as a keyboard or a mouse, and a device capable of reading the HMI drawing data 2. In addition, the processing circuit also includes a network device (not shown) that is connected with the HMI server device 31 and can transmit and receive signal data and a control command.

The processor 32a executes various programs stored in the memory 32b and thereby implements the functions of the units of the HMI terminal device 32.

Each unit of the HMI server device 31 shown in FIG. 1 indicates a part of functions included in the HMI server device 31 and each of the functions is implemented by a processing circuit. The processing circuit is constituted by connecting a processor 31a, a memory 31b, and a network interface 31d. The network interface 31d is a device that is connected with the supervisory control system 4 and the HMI terminal device 32 and can transmit and receive signal data and a control command. The processor 31a executes various programs stored in the memory 31b and thereby implements the functions of the units of the HMI server device 31.

The embodiment according to the present invention has been described above; however, the present invention is not limited to the above embodiment and various modifications can be made without departing from the spirit of the present invention.

REFERENCE SIGNS LIST

1 Drawing creation device
11 Drawing editor
12 Drafting unit
13 Part runtime attribute generation unit
14 HMI drawing data output unit
2 HMI drawing data
21 SVG data
22 Part runtime attribute data
3 HMI
31 HMI server device
311 HMI Server Runtime
32 HMI terminal device
321 Web browser
322 HMI Web Runtime
4 Supervisory control system
5 Communication base
6 RIO
7 Monitoring target device
121 Stencil area
121a-121c Prototype of part
122 Drafting area
322a Part-specific processing unit
322b Part management information
322c SVG data reading processing unit
322d Signal data reception unit
322e Drawing updating unit
322f Event processing unit
322g Control command transmission unit
1a, 31a, 32a Processor
1b, 31b, 32b Memory
1c, 32c Display
1d Input/output interface
31d Network interface
32d Input interface

The invention claimed is:

1. A process line HMI system connected to a monitoring target device, the process line HMI system comprising:
a display that displays a HMI screen, and
at least one processor configured to:
render a process line on the HMI screen, the process line including:
a movable looper group part obtained by grouping at least one movable roll part and a plurality of line parts connected to the movable roll part; and
a plurality of fixed roll parts connected to the movable looper group part;
continuously obtain a process line current length from the monitoring target device;
calculate a looper movement amount by dividing a difference between a process line total length and the process line current length by a number of parts in the plurality of line parts, wherein the plurality of line parts are shared by the movable looper group part with the plurality of fixed roll parts; and
change a relative position between the plurality of fixed roll parts and the movable looper group part on the HMI screen according to the looper movement amount.

2. The process line HMI system according to claim 1, wherein
the processor is configured to:
continuously obtain a line length from a start point of the process line to a weld point from the monitoring target device; and
change a position of the weld point on the process line according to the line length.

3. The process line HMI system according to claim 1, wherein
the process line further includes a reel part whose circumference is contacted by one end of the line parts; and
the processor is configured to:
continuously obtain a current reel diameter from the monitoring target device; and
change a diameter of the reel part according to the current reel diameter while one end of the line parts is in contact with the circumference.

4. The process line HMI system according to claim 1, wherein
the movable roll part or the fixed roll parts include a plurality of glue points on a circumference thereof; and
the processor is configured to:
automatically generate a third line part connected to a first line part and a second line part along an arc between a first glue point and a second glue point of the plurality of glue points, wherein one end of the first line part is connected to the first glue point, and one end of the second line part is connected to the second glue point.

5. The process line HMI system according to claim 2, wherein
the movable roll part or the fixed roll parts include a plurality of glue points on a circumference thereof; and
the processor is configured to:
automatically generate a third line part connected to a first line part and a second line part along an arc between a first glue point and a second glue point of the plurality of glue points, wherein one end of the first line part is connected to the first glue point, one end of the second line part is connected to the second glue point.

6. The process line HMI system according to claim 3, wherein
the movable roll part or the fixed roll parts include a plurality of glue points on a circumference thereof; and
the processor is configured to:
automatically generate a third line part connected to a first line part and a second line part along an arc between a first glue point and a second glue point of the plurality of glue points, wherein one end of the first line part is connected to the first glue point, one end of the second line part is connected to the second glue point.

7. The process line HMI system according to claim 2, wherein the process line further includes a reel part whose circumference is contacted by one end of the line parts; and the processor is configured to:

continuously obtain a current reel diameter from the monitoring target device; and change a diameter of the reel part according to the current reel diameter while one end of the line parts is in contact with the circumference.

* * * * *